(12) United States Patent
Hahn

(10) Patent No.: US 7,076,795 B2
(45) Date of Patent: Jul. 11, 2006

(54) SYSTEM AND METHOD FOR GRANTING ACCESS TO RESOURCES

(75) Inventor: Timothy James Hahn, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 10/044,186

(22) Filed: Jan. 11, 2002

(65) Prior Publication Data

US 2003/0135755 A1    Jul. 17, 2003

(51) Int. Cl.
 H04L 9/32 (2006.01)
 G06F 7/04 (2006.01)
 G06F 17/30 (2006.01)

(52) U.S. Cl. .................. 726/2; 707/1; 707/9

(58) Field of Classification Search .............. 726/21, 726/2; 707/1, 9, 6, 10
See application file for complete search history.

(56) References Cited

U.S. PATENT DOCUMENTS

| | | | |
|---|---|---|---|
| 5,241,594 A | 8/1993 | Kung | |
| 5,263,157 A | 11/1993 | Janis | |
| 5,375,244 A * | 12/1994 | McNair | 710/200 |
| 5,604,490 A | 2/1997 | Blakley, III et al. | |
| 5,655,077 A | 8/1997 | Jones et al. | |
| 5,689,638 A | 11/1997 | Sadovsky | |
| 5,768,503 A | 6/1998 | Olkin et al. | |
| 5,790,785 A | 8/1998 | Klug et al. | |
| 5,872,915 A | 2/1999 | Dykes et al. | |
| 5,875,296 A | 2/1999 | Shi et al. | |
| 5,892,902 A | 4/1999 | Clark et al. | |
| 5,918,228 A | 6/1999 | Rich et al. | |
| 6,006,333 A | 12/1999 | Nielsen | |
| 6,067,623 A | 5/2000 | Blakley, III et al. | |
| 6,092,196 A | 7/2000 | Reiche | |
| 6,092,203 A | 7/2000 | Ooki et al. | |
| 6,131,164 A | 10/2000 | Parker | |

(Continued)

OTHER PUBLICATIONS

"Password Managers" http://www.traffick.com/dir/tools/passwords.asp.

(Continued)

Primary Examiner—Matthew Smithers
(74) Attorney, Agent, or Firm—Arthur J. Samodovitz

(57) ABSTRACT

A method and system for authorizing access to resources requested by a first user. To begin the process, the first user submits an ID of the first user as an individual requesting access to one of the resources. The first user is also a member of a group comprising a plurality of individual users. A first table indicates at least one group of a plurality of individual users. A second table indicates which resources are accessible by which of the users and which resources are accessible by which of the groups. An authorization program compares the first user to entries in the first table to determine which group or groups the first user is a member. Next, the authorization program compares the first user and the group or groups in which the first user is a member to entries in the second table to determine which resources the first user is authorized to access. Thus, the resources that the user ID is authorized to access are based not only on the user as an individual, but the group or groups in which the user is a member. The user need submit only one ID of the user as an individual to access both sets of resources.

18 Claims, 4 Drawing Sheets

U.S. PATENT DOCUMENTS

| | | |
|---|---|---|
| 6,144,959 A | 11/2000 | Anderson et al. |
| 6,178,511 B1 | 1/2001 | Cohen et al. |
| 6,182,229 B1 | 1/2001 | Nielsen |
| 6,199,077 B1 | 3/2001 | Inala et al. |
| 6,205,480 B1 | 3/2001 | Broadhurst et al. |
| 6,233,576 B1 * | 5/2001 | Lewis ............................ 707/9 |
| 2003/0065794 A1 * | 4/2003 | Akazawa et al. ............ 709/229 |
| 2004/0015703 A1 * | 1/2004 | Madison et al. ............. 713/185 |

OTHER PUBLICATIONS

"v-Go: One Password Fits All" http://www.pcworld.com/resorce/printable/article/0,aod,10442,00.asp.

"Password Manager" http://www.webattack.com/shareware/security/swpass.shtml.

"PASSPORT" http://www.msn.com/help/faq.asp#gen0c.

* cited by examiner

FIG. 2A

| Cross-Referencing Authorization Table 22a | |
|---|---|
| AuthenicationID | User Name |
| rsmith@IBM.com | Robert Smith_Main_IBM |
| tjones@IBM.com | Thomas Jones_Main_IBM |
| bjohnson@ibm.com | Betty Johnson_Main_IBM |

FIG. 2B

| Cross-Referencing Authorization Table 22b | | |
|---|---|---|
| Group ID | Group Name | Members/User Ids |
| Progroup@IBM.com | Programmer_Main_IBM | Robert Smith_Main_IBM<br>Thomas Jones_Main_IBM<br>Betty Johnson_Main_IBM |
| Tesgroup@IBM.com | Test_Main_IBM | Thomas Jones_Main_IBM<br>Betty_Johnson_Main_IBM |

FIG. 2C

| Cross-Referencing Authorization Table 22b | |
|---|---|
| AuthenicationID | User Name |
| rsmith@IBM.com | Robert Smith_Elm_IBM |
| tjones@IBM.com | Carol Parker_Elm_IBM |
| bjohnson@ibm.com | Debbie Harris_Elm_IBM |
| | Mark Henry_Oak_IBM |

FIG. 2D

Cross-Referencing Authorization Table 22d

| Group ID | Group Name | Members/U |
|---|---|---|
| Progroup@IBM.com | Programmer_Elm_IBM | Robert Smith_Elm_IBM<br>Carol Parker_Elm_IBM |
| Debgroup@IBM.com | Debug_Oak_IBM | Robert Smith_Oak_IBM<br>Debbie Harris_Main_IBM |

FIG. 2E

Cross-Referencing Authorization Table 22e

| AuthenicationID | User Name |
|---|---|
| robsmith@IBM.com | Robert Smith_Oak_IBM |
| dstein@IBM.com | David Stein_North_IBM |

FIG. 3

Cross-Referencing Authorization Table

| Authorized Name/Group ID | Resource Name |
|---|---|
| Robert Smith_Main_IBM | Customer Data |
| Robert Smith_Elm_IBM | Schedule Data |
| Thomas Jones_Main_IBM | Schedule Data |
| Betty Smith_Main_IBM | Finance Data |
| ProGroup_Main_IBM | Program Functions Data |
| ProGroup_Elm_IBM | Program Requirements Data |
| DebGroup_Oak_IBM | Problem Report Data |

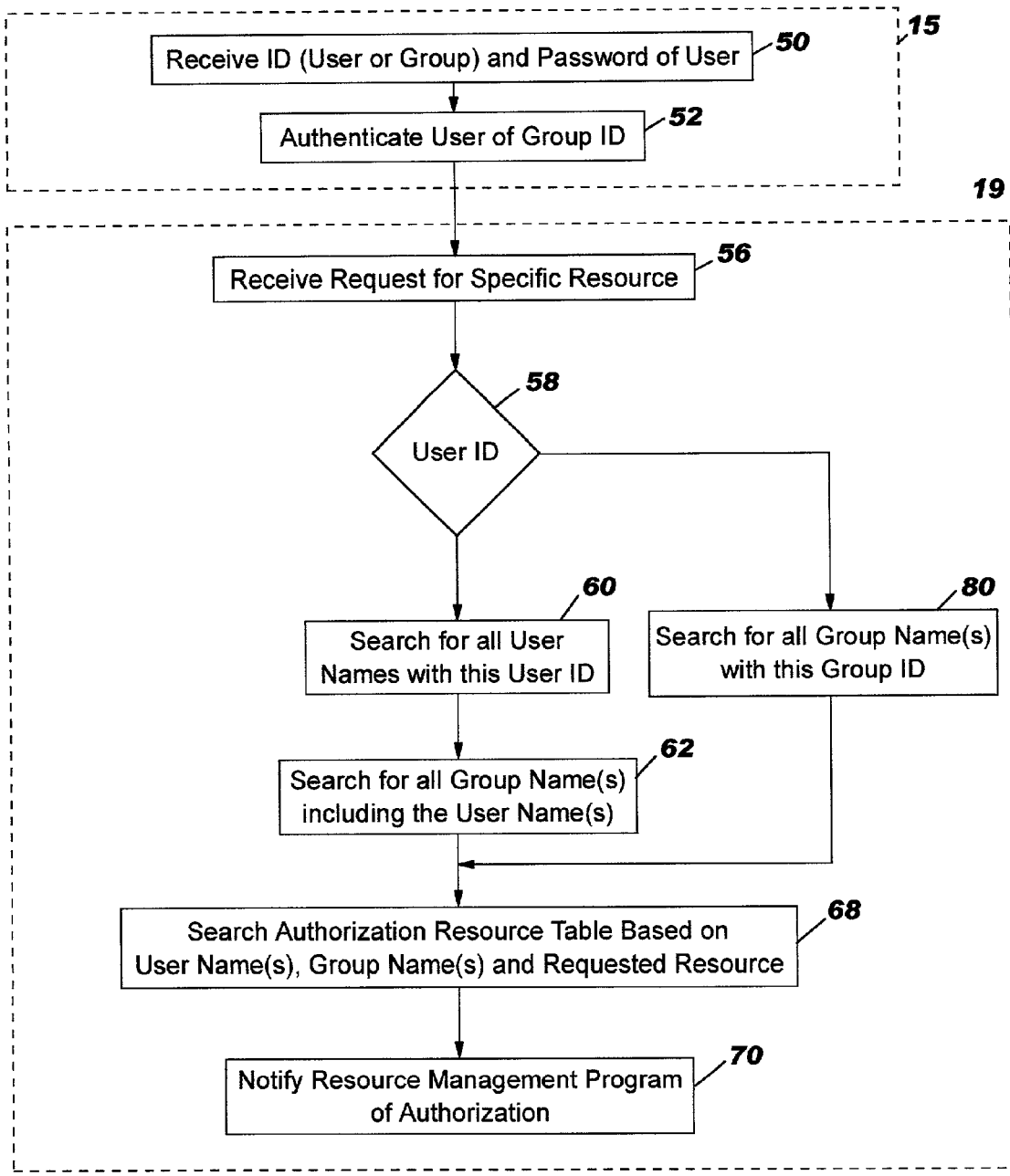

SYSTEM AND METHOD FOR GRANTING ACCESS TO RESOURCES

BACKGROUND OF THE INVENTION

The invention relates generally to computer systems and deals more particularly with a system and method for determining which resources a user can access.

In many computing systems, there is a need to determine whether a user who is requesting information or some other resource is allowed to access the resource. A common technique to determine whether the user is allowed to access the resource involves authentication and authorization. Authentication is the process of determining whether the requesting user is, in fact, the user that has been represented by the user. This is typically done by comparing the ID and password submitted by the user to entries in an authentication table to determine if they match. The ID submitted by the user can be an ID associated with the user as an individual or an ID associated with a group in which the user is a member. Authorization is the process of determining whether the authenticated user or group has been granted access (i.e. has been authorized) to access the resource that has been requested. The authorization system indicates which resources each individual user is permitted to access and which resources each group is permitted to access. These authorizations may have been assigned previously by a system administrator to control access to sensitive or restricted resources. It is common for authentication and authorization to be handled as separate steps, although in most cases the authentication system is closely tied to the authorization system.

Some times, the same user has different user IDs or can gain access through a group ID for a group in which the user is a member. Each different user ID can be permitted to access different resources. For example, Mr. Jones as an individual can be granted access to resource X via one user ID and Mr. Jones as an individual can be granted access to resource Y via a different user ID. Also, Mr. Jones as part of a group can be granted access to resources Z via another group ID. Thus, the resources that a given user is permitted to access depends on what ID the user submits with his or her request. While such a technique is effective in controlling access to sensitive or restricted resources, a single person may need to make multiple requests with multiple IDs to access all the resources that the person is permitted to access.

Accordingly, an object of the present invention is to simplify the authorization process for a user to access different resources where the user has or can use more than one ID and each ID alone is not granted authority to access all of these resources.

SUMMARY OF THE PRESENT INVENTION

The present invention resides in a method and system for authorizing access to resources requested by a first user. To begin the process, the first user submits an ID of the first user as an individual requesting access to one of the resources. The first user is also a member of a group comprising a plurality of individual users. The user ID is authenticated although the authentication process is not part of the present invention. The present invention includes various tables and programs involved in the authorization process. A first table indicates at least one group of a plurality of individual users. A second table indicates which resources are accessible by which of the users and which resources are accessible by which of the groups. An authorization program compares the first user to entries in the first table to determine which group or groups the first user is a member. Next, the authorization program compares the first user and the group or groups in which the first user is a member to entries in the second table to determine which resources the first user is authorized to access. Thus, the resources that the user ID is authorized to access are based not only on the user as an individual, but the group in which the user is a member.

BRIEF DESCRIPTION OF THE DRAWINGS

FIGS. 2*a–e* illustrate in more detail a cross-referencing authorization data base of FIG. 1.

FIG. 3 illustrates in more detail a resource authorization data base of FIG. 1.

FIG. 4 is a flow chart illustrating operation and implementation of the present invention.

DETAILED DESCRIPTION OF THE PREFERRED EMBODIMENTS

Figure 1:
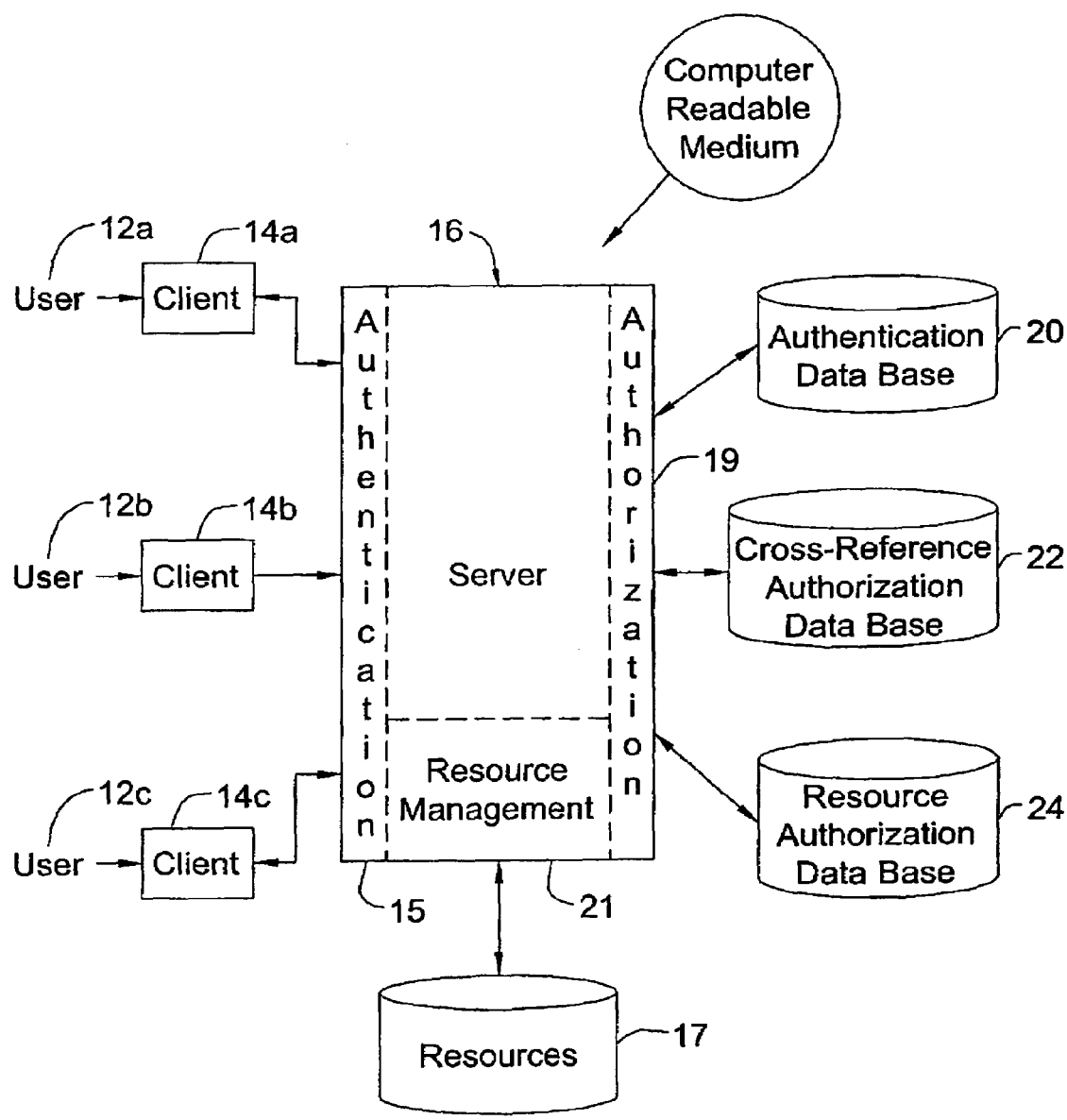
FIG. 1 is a block diagram illustrating components of the present invention.

Referring now to the figures in detail, wherein like reference numbers indicate like elements throughout, FIG. 1 illustrates a computer system or network generally designated 10 according to the present invention. Network 10 comprises multiple clients 14*a, b, . . . n* in the form of programmed personal computers or terminals, a common server computer 16, a resource data base 17, an authentication data base 20, a cross-referencing authorization data base 22 and a resource authorization data base 24. In the illustrated embodiment, the resource data base 17 is shown as being stored on a single, external disk drive, although the resource data base can be stored on multiple disk drives, external or internal to the server. The resource data base 17 may store data, computer programs or other resources. Each client 14*a, b, . . . n* is operated by a respective (human) user 12*a, b, . . . n*. The server can access any of the data bases 17, 20, 22 and 24 on behalf of a user. FIG. 1 also illustrates an authentication program 15, an authorization program 19 and a resource management program 21 within the server 16.

The authentication data base 20 includes an authentication table. The authentication table includes in a first column a list of IDs of (individual) users or groups, and in a second column a valid password for each ID. All IDs in the authentication system are typically associated with the name of the authentication data base such as the name of a corporation that issued the IDs. If a user submits a valid user ID and matching password from an authentication data base that the server recognizes, then the user is authenticated and can log-on or establish a session with server 16.

FIG. 2 illustrates the cross-referencing authorization data base 22 in more detail. The cross-referencing data base includes tables 22*a–e* storing IDs and ID related information for individuals and groups. By way of example, Table 22*a* contains user ID information for selected individuals from IBM corporation. The first column of Table 22*a* lists user IDs (including the authenticating data base name) for individuals, for example rsmith@IBM.com, tjones@IBM.com, and bjohnson@IBM.com. The second column of Table 22*a* lists the corresponding user description including the user's name, organization and company. (In this example, the corporation is divided into different organizations, by location or department.) Table 22*a* lists in the second column, Robert Smith from Main organization of IBM, Thomas Jones from Main organization of IBM, and Betty Johnson from Main organization of IBM. Thus, Robert Smith from Main organization of IBM is the user who submits user ID rsmith@IBM.com. Likewise, Thomas Jones from Main organization of IBM is the user who submits user ID tjones@IBM.com and Betty Johnson from Main organization of IBM is the user who submits user ID bjohnson@IBM.com.

Table 22b contains group IDs and related information for various groups of individual users. The first column of Table 22b lists group IDs (including the authenticating data base name), for example, Progroup from IBM and Tesgroup from IBM. The second column of Table 22b lists the corresponding group description, including the name of the group, organization and company, for example, Programmer_Main_IBM meaning the Programmer group from Main organization of IBM. The third column of Table 22b lists the descriptions of the individuals, by name, organization and company, who are members of the corresponding group. For example, Robert Smith of Main organization and IBM company, Thomas Jones of Main organization and IBM company and Betty Johnson of Main organization and IBM company are all members of the Programmer group.

Table 22c contains additional user information for rsmith@IBM.com and user information for three additional individual users. Table 22c has the same format as Table 22a. The user descriptions from Table 22c have different organization components than the user descriptions from Table 22a. The user descriptions from Table 22c include an Elm or Oak component whereas the user descriptions from Table 22a all include a Main component. It should be noted that the same user ID, rsmith@IBM.com appears in both Tables 22a and 22c and represents the same person, although the user description recorded in the second column of each table is different. Table 22a lists Robert Smith_Main_IBM whereas Table 22c lists Robert Smith_Elm_IBM. As explained in more detail, in the illustrated embodiment of the present invention, the entire user description forms an entry in the authorization data base.

Table 22d contains additional group information for Progroup@IBM.com and group information for an additional group, Debgroup@IBM.com. Table 22d has the same format as Table 22b. The group descriptions from Table 22d have different organization components than the group descriptions from Table 22b. The group descriptions from Table 22d include an Elm or Oak component whereas the group descriptions from Table 22b include a Main component.

Table 22e contains an additional user ID on a different system for Robert Smith and user information for one additional individual. Table 22e has the same format as Table 22a. The user descriptions from Table 22e have different organization components than the user descriptions from Table 22a. The user descriptions from Table 22e include an Oak or North component whereas the user descriptions from Table 22a include a Main component. It should be noted that the same person, Robert Smith, has a different user ID and user description in Table 22e than in Table 22a.

FIG. 3 illustrates the Resource Authorization data base 24 in more detail. The Resource Authorization data base includes a table indicating which user descriptions and which group descriptions are authorized to access which resources. The first column of the table lists the user descriptions and group descriptions and the second column lists the resources that each user description or group description is authorized to access. For example, Robert Smith_Main_IBM is authorized to access Customer data, Robert Smith_Elm_IBM is authorized to access Schedule data, Thomas Jones_Main_IBM is authorized to access Schedule data, Betty Smith_Main_IBM is authorized to access Finance data, ProGroup_Main_IBM is authorized to access Program Functions data, Programmer_Elm_IBM is authorized to access Program Requirements data, Debug_Oak_IBM is authorized to access Problem Report data, etc. Even though the individual members of each group are authorized to access the data available to the Group ID, the Resource Authorization table 24 does not include an index for each of the members of the group to the data accessible to their group. For example, even though Carol Parker_Elm_IBM is a member of the Programmer_Elm_IBM, Resource Authorization table 24 does not indicate that Carol Parker_Elm_IBM has access to the Program Requirements data. It should be noted that the Resource Authorization table does not include an index for user IDs or group IDs. Also, in the illustrated embodiment of the Resource Authorization table and the authorization program described below, access is based on the entire user description or group description, not just the user name or group name. However, if desired access could be based on the user name or group name without the organization component or the company component.

FIG. 4 illustrates the authentication program 15 (Steps 50 and 52) and authorization program 19 (Steps 56, 58, 60, 62, 68, 70, 80) within server 16 in more detail. User 12a, acting through client 14a, attempts to log-on or establish a session with the server 16 by entry of the ID and password of the user at the client along with an indication that a log on or session with the server is requested. The ID can be that of an individual or a group. However, in this first example, assume the ID is from an individual user, rsmith@IBM.com. (Step 50) In response, the authentication program 15 within server checks for this combination of user ID and password in the authentication table of data base 20 to determine if they match. (Step 52) (Other authentication techniques are also known and usable and are not considered part of the present invention. For example, a process involving a digital certificate can be used to indicate authenticity.) Assuming the user ID is authenticated, the user next requests access to a specific resource such as Program Requirements data. In response, the user ID is passed to the authorization program 19 along with the request for the specified resource. (Step 56) (It is also possible that the authentication program at this time can substitute another, unique ID for the ID that was submitted by the user. If so, the following explanation of the present invention applies to the substitute user ID.) The authorization program determines that the ID is a user ID. (Decision 58) Next, the authorization program reads the first column of tables 22a,c,e, searching for this user ID. The authorization program will identify the first row of Table 22a and the first row of Table 22c. Table 22a indicates that rsmith@IBM.com is the user ID for Robert Smith_Main_IBM and Table 22c indicates that rsmith@IBM.com is the user ID for Robert Smith_Elm_IBM. (Step 60). Next, the authorization program 19 searches for any groups in which Robert Smith_Main_IBM or Robert Smith_Elm_IBM is a member. Thus, authorization program 19 next reads the third column of Tables 22b and 22d, searching for either of these user descriptions. Authorization program identifies the first row in Table 22b for Programmer_Main_IBM, and the first row of Table 22d for Programmer_Elm_IBM. (Step 62). It should be noted that the authorization program 19 did not identify the second row of Table 22d for Debug_Oak_IBM because this group includes a different user description, Robert Smith_Oak_IBM, for the same person, Robert Smith. At this point, the authorization program has determined that the user ID rsmith@IBM.com is authorized to access data accessible to Robert Smith_Main_IBM, Robert Smith_Elm_IBM, Programmer_Main_IBM and Programmer_Elm_IBM.

Next, the authorization program searches down the Resource Authorization table to attempt to locate a row containing the name of the requested data (in the second column) and the descriptions of the users and groups (in the first column) identified in steps 60 and 62. In the foregoing example, the entities identified in steps 60 and 62 are Robert Smith_Main_IBM, Robert Smith_Elm_IBM, Programmer_Main_IBM and Programmer_Elm_IBM and the requested data is Program Requirements. (Step 68) In the illustrated example, the authorization is found in the sixth row. Therefore, the authorization program concludes that the request by user ID rsmith@IBM.com to access the Program Requirements data should be granted (even though the entries in the Resource Authorization table for Robert Smith_Main_IBM and Robert Smith_Elm_IBM do not indicate authorization to access the Program Requirements data). Next, the authorization program notifies Resource Management Program 21 that the request by rsmith@IBM.com to access the Program Requirements data should be granted. (Step 70) Finally, the server downloads the Program Requirements data to the client 14a so that the user 12a can access the Program Requirements data.

Referring again to step 50, assume in this next example that the user submits an ID of the user as an individual such as rsmith@IBM.com and then another ID of a group in which the user is a member, such as Debgroup@IBM.com. In response, the authentication program 15 within server checks for this combination of individual user ID and associated password and this combination of group ID and associated password in the authentication table of data base 20 to determine if both sets match. (Step 52) Assuming both sets match, the individual user ID and the group ID are considered authenticated.

Next, the user requests access to a specific resource such as Problem Reports data. (Step 56) For purposes of explanation, the handling of this request by the authorization program can be viewed as processing part of the request based on the individual user ID and processing the other part of the request based on the group ID to determine if either processing yields the requested authorization. The authorization program processes the part of the request based on the individual user ID, rsmith@IBM.com, in steps 60, 62, 68 and 70 as described above (when the individual user ID is submitted without any group ID). However, the processing of this part of the request based on the individual user ID will not yield authorization to access the Problem Reports data as explained above. However, the processing of the other part of the request based on the group ID in steps 80, 68 and 70 will yield authorization to access the Problem Reports data, as follows. The authorization program reads the first column of tables 22b,d searching for this group ID. The authorization program will identify the second row of Table 22d. Table 22b indicates that Debgroup@IBM.com is the group ID for Debug_Oak_IBM. (Step 80). Thus, the authorization program has determined that the group ID Debgroup@IBM.com is authorized to access data accessible to Debug_Oak_IBM, and none other. Next, the authorization program searches down the Resource Authorization table to attempt to locate a row where Debug_Oak_IBM is listed in the first column and the requested data, Problem Report data, is listed in the second column. (Step 68). (As explained above, pursuant to the submission of the individual user ID, rsmith@IBM.com, the authorization program also searched down the Resource Authorization table to attempt to locate a row where Robert Smith_Main_IBM, Robert Smith_Elm_IBM, Programmer_Main_IBM or Programmer_Elm_IBM is listed in the first column and Problem Report data was listed in the second column, but this was unsuccessful.) In the illustrated example, the seventh row lists Debug_Oak_IBM in the first column and the requested data, Problem Report data, in the second column. Therefore, the authorization program concludes that the request by the combination of user ID rsmith@IBM.com and group ID Debgroup@IBM.com to access the Problem Reports data should be granted and notifies Resource Management Program 21. (Step 70) Finally, the server downloads the Problem Reports data to client 14a so that the user can access the Problem Reports data.

Based on the foregoing, a system and method for determining which resources a user can access based on user IDs or group IDs have been disclosed in accordance with the present invention. However, numerous modifications and substitutions can be made without deviating from the scope of the present invention. For example, the Resource Authorization table could also be indexed by user ID and group ID instead of user description and group description. Also, other user IDs, groups of users and group IDs can and will be included in the tables of data base 22. Therefore, the present invention has been disclosed by way of illustration and not limitation, and reference should be made to the following claims to determine the scope of the present invention.

What is claimed:

1. System for authorizing access to a resource requested by a user, said system comprising:
    a first table entry listing a userID and a first name of said user as an individual which validly corresponds to said userID;
    a second table entry listing said userID and a second, different name of said user as an individual which validly corresponds to said userID;
    a third table entry indicating that said first user name is part of a first group of individuals;
    a fourth table entry indicating that said second user name is part of a second, different group of individuals;
    fifth table entries listing:
        said first name and a first resource accessible to said first name,
        said second name and a second resource accessible to said second name,
        said first group and a third resource accessible to said first group, and
        said second group and a fourth resource accessible to said second group; and
    authorization means, responsive to receipt of a request based on said userID to access a resource and authentication of said userID, for determining based on said first table entry that said userID corresponds to said first user name, determining based on said second table entry that said userID also corresponds to said second user name, determining based on said third table entry that said first user name is part of said first group, determining based on said fourth table entry that said second user name is part of said second group, and determining based on said fifth table entries whether any of said first name, said second name, said first group or said second group is authorized to access the requested resource, and if so, granting said userID access to said requested resource.

2. A system as set forth in claim 1 wherein said user submits a password along with said userID, and further comprising authentication means for validating a combination of said password and said userID to authenticate said userID.

3. A system as set forth in claim 1 wherein said first group but not said first name, said second name or said second group is directly listed as authorized to access said requested resource.

4. A system as set forth in claim 1 wherein said second name, but not said first name, said first group or said second group is directly listed as authorized to access said requested resource.

5. A system as set forth in claim 1 wherein:
said first name comprises a first, last or nickname of said user and a first geographic location associated with said user; and
said second name comprises said first, last or nickname of said user and a second, different geographic location associated with said user.

6. A system as set forth in claim 1 wherein said third table entry identifies said first group of individuals by a first group name and a first group ID, and said fourth table entry identifies said second group of individuals by a second group name and a second group ID.

7. Method for authorizing access to a resource requested by a user, said method comprising the steps of:
generating a first table entry listing a userID and a first name of said user as an individual which validly corresponds to said userID;
generating a second table entry listing said userID and a second, different name of said user as an individual which validly corresponds to said userID;
generating a third table entry indicating that said first user name is part of a first group of individuals;
generating a fourth table entry indicating that said second user name is part of a second, different group of individuals;
generating fifth table entries listing:
said first name and a first resource accessible to said first name,
said second name and a second resource accessible to said second name,
said first group and a third resource accessible to said first group, and
said second group and a fourth resource accessible to said second group; and
in response to receipt of a request based on said userID to access a resource and authentication of said userID, automatically determining based on said first table entry that said userID corresponds to said first user name, automatically determining based on second table entry that said userID also corresponds to said second user name, automatically determining based on said third table entry that said first user name is part of said first group, automatically determining based on said fourth table entry that said second user name is part of said second group, and automatically determining based on said fifth table entries whether any of said first name, said second name, said first group or said second group is authorized to access the requested resource, and if so, granting said userID access to said requested resource.

8. A method as set forth in claim 7 wherein said user submits a password along with said userID, and further comprising the step of validating a combination of said password and said userID to authenticate said userID.

9. A method as set forth in claim 7 wherein said first group but not said first name, said second name or said second group is directly listed as authorized to access said requested resource.

10. A method as set forth in claim 7 wherein said second name, but not said first name, said first group or said second group is directly listed as authorized to access said requested resource.

11. A method as set forth in claim 7 wherein:
said first name comprises a first, last or nickname of said user and a first geographic location associated with said user; and
said second name comprises said first, last or nickname of said user and a second, different geographic location associated with said user.

12. A method as set forth in claim 7 wherein said third table entry identifies said first group of individuals by a first group name and a first group ID, and said fourth table entry identifies said second group of individuals by a second group name and a second group ID.

13. A computer program product for authorizing access to a resource requested by a user, said computer program product comprising:
a computer readable medium;
first program instructions to generate a first table entry listing a userID and a first name of said user as an individual which validly corresponds to said userID;
second program instructions to generate a second table entry listing said userID and a second, different name of said user as an individual which validly corresponds to said userID;
third program instructions to generate a third table entry indicating that said first user name is part of a first group of individuals;
fourth program instructions to generate a fourth table entry indicating that said second user name is part of a second, different group of individuals;
fifth program instructions to generate fifth table entries listing:
said first name and a first resource accessible to said first name,
said second name and a second resource accessible to said second name,
said first group and a third resource accessible to said first group, and
said second group and a fourth resource accessible to said second group; and
sixth program instructions, responsive to receipt of a request based on said userID to access a resource and authentication of said userID, to determine based on said first table entry that said userID corresponds to said first user name, determine based on said second table entry that said userID also corresponds to said second user name, determine based on said third table entry that said first user name is part of said first group, determine based on said fourth table entry that said second user name is part of said second group, and determine based on said fifth table entries whether any of said first name, said second name, said first group or said second group is authorized to access the requested resource, and if so, grant said userID access to said requested resource; and wherein
said first, second, third, fourth, fifth and sixth program instructions are recorded on said computer readable medium.

14. A computer program product as set forth in claim 13 wherein said user submits a password along with said userID, and further comprising seventh program instructions to validate a combination of said password and said userID to authenticate said userID; and wherein said seventh program instructions are recorded on said computer readable medium.

15. A computer program product as set forth in claim 13 wherein said first group but not said first name, said second name or said second group is directly listed as authorized to access said requested resource.

16. A computer program product as set forth in claim 13 wherein said second name, but not said first name, said first group or said second group is directly listed as authorized to access said requested resource.

17. A computer program product as set forth in claim 13 wherein:
  said first name comprises a first, last or nickname of said user and a first geographic location associated with said user, and
  said second name comprises said first, last or nickname of said user and a second, different geographic location associated with said user.

18. A computer program product as set forth in claim 13 wherein said third table entry identifies said first group of individuals by a first group name and a first group ID, and said fourth table entry identifies said second group of individuals by a second group name and a second group ID.

* * * * *

UNITED STATES PATENT AND TRADEMARK OFFICE
CERTIFICATE OF CORRECTION

PATENT NO. : 7,076,795 B2 Page 1 of 1
APPLICATION NO. : 10/044186
DATED : July 11, 2006
INVENTOR(S) : Timothy James Hahn It is certified that error appears in the above-identified patent and that said Letters Patent is hereby corrected as shown below:

Please change (73) Assignee to "International Business Machines Corporation".

Signed and Sealed this

Twenty-first Day of November, 2006

JON W. DUDAS
*Director of the United States Patent and Trademark Office*